United States Patent [19]

Meissner

[11] Patent Number: 5,990,660
[45] Date of Patent: Nov. 23, 1999

[54] PROCESS FOR IMPROVING THE CHARGING AND DISCHARGING CAPACITY OF STORAGE BATTERIES

[75] Inventor: Eberhard Meissner, Hofheim, Germany

[73] Assignee: V B Autobatterie GmbH, Hannover, Germany

[21] Appl. No.: 09/237,112

[22] Filed: Jan. 26, 1999

[30] Foreign Application Priority Data

Jan. 29, 1998 [DE] Germany ............................ 198 03 312

[51] Int. Cl.$^6$ .................................................. H01M 10/44
[52] U.S. Cl. ............................................ 320/127; 320/136
[58] Field of Search .................................... 320/118, 124, 320/125, 127, 134, 135, 136, 150, 153, FOR 134; 429/20, 61, 62

[56] References Cited

U.S. PATENT DOCUMENTS

| 5,395,706 | 3/1995 | Hall ....................................... 320/134 X |
| 5,488,283 | 1/1996 | Dougherty et al. ..................... 307/10.7 |
| 5,508,126 | 4/1996 | Braun ........................................... 429/7 |

FOREIGN PATENT DOCUMENTS 41 42 628 C1   5/1993   Germany .

*Primary Examiner*—Edward H. Tso
*Attorney, Agent, or Firm*—Schnader Harrison Segal & Lewis

[57] ABSTRACT

The invention pertains to a process for improving the charging and discharging capacity of storage batteries at low temperatures. The improvement in the charging and discharging of storage batteries is accomplished by raising their temperature, using for this purpose the energy stored in the batteries. The process is conducted in such a way that the temperature and at least one value characterizing the state of charge are measured before the beginning of the heating and during the heating and the storage battery is discharged through an electrical component introducing thermal energy into it, at which time the discharge is terminated when either the target loadability in the discharging or charging was achieved or the state of charge decreases below a threshold value.

24 Claims, No Drawings

PROCESS FOR IMPROVING THE CHARGING AND DISCHARGING CAPACITY OF STORAGE BATTERIES

TECHNICAL FIELD OF THE INVENTION

The invention pertains to a process for improving the charging and discharging capacity of storage batteries at low temperatures.

BACKGROUND OF THE INVENTION

The performance capacity of electrochemical energy storage systems generally diminishes strongly with decreasing operating temperature. This is especially true when dealing with the capability to supply discharge currents which, relative to the capacity of the battery, are one-hour discharge current. In order to counteract this fundamental property of storage batteries various solutions have already been proposed. Thus it is known, for example, that storage batteries may be heated by an external energy source. Use is made of this fact in storage batteries in the military sector which are constantly being recharged in readiness operation. This process is also employed in storage batteries installed in satellites. Furthermore, the above-noted process is used in so-called high-temperature batteries in which the storage battery cells which are combined to form a battery are electrically heated from an external energy source during the charging process. The use of latent heat storage systems to keep storage batteries above a minimal temperature is also known. Further, it has been proposed that the energy stored in the storage batteries be used for heating batteries. This process is utilized especially for high-temperature batteries used for electrotraction, because such batteries are no longer ready to operate below a certain minimal temperature. The temperature of these batteries must therefore always be held above the system-specific minimal temperature, and if necessary the electrical energy stored in the battery is used to increase temperature.

In German patent DE-A 41 42 628, a process and an apparatus are proposed for heating a storage battery in which a power transistor serves as the heating element which is arranged in the battery and is operated by temperature control. The battery is heated as a function of the battery temperature and battery voltage, a lower limiting value being defined for the battery voltage beyond which no heating is performed. In order to avoid unnecessary heating of the battery from its own power supply, a trigger switch is provided. Alternatively, to the proposed trigger circuit which consists of a temperature sensor and a power transistor, a PTC resistor can also be used in combination with a trigger circuit.

SUMMARY OF THE INVENTION

The invention has the objective of devising a process which permits the heating of a storage battery from its own power supply in the shortest possible time without thereby causing damage to the internal structure of the battery.

The invention contributes to the solution of the problem by a method which comprises improving the charging and discharging capacity of storage batteries by raising the temperature of a storage battery using energy stored in the storage battery. First, a temperature and at least one state of charge value is measured before and during heating of the storage battery. Then, the storage battery is discharged through an electrical component introducing heating energy into it. Finally, the discharge is ended if either one of the following two occurrences takes place: a sought (target) loadability in discharging or charging is achieved or; the state of charge value goes below a threshold value.

The process according to the invention makes allowance, in particular, for the nature of electrochemical reactions occurring in the storage battery. For heating the storage battery one uses both a heating element powered by it as well as the quantity of heat produced during the current flow through the internal resistors of the storage battery. In this manner all of the electrical energy taken from the storage battery is transformed into heat and utilized almost completely for heating the storage battery. According to the invention, the magnitude of the electrical resistance of the external heating element is selected in such a manner that the storage battery produces power which leads to rapid heating of the storage battery without damage to the internal structure of the storage battery.

The higher specific energy density (Wh/kg) is relative to the specific heat capacity (Wh/kg/degree), the more economical the process of heating a storage battery by the power supply stored in it becomes. For example, lithium-ion batteries display high energy density and can be operated in the range from about 50° C. to +100° C. Their energy density lies in the range from 80 to 180 wh/kg and their specific heat is about 1 kJ/kg/degree. The energy content of a lithium-ion battery is therefore sufficient to heat the battery by several 100 degrees.

While it is quite advisable for the above-mentioned lithium-ion storage batteries to use part of the energy content to heat the storage battery, such a process is senseless if more power is taken off then gained from the heated storage battery. For example, the ratio of the heat capacity of a lead storage battery to its energy density is poorly suited for this process.

DETAILED DESCRIPTION OF THE INVENTION

Reference will now be made in detail to the present preferred by embodiments of the invention.

The fastest possible heating of a storage battery is theoretically achieved when the storage battery is temporarily short circuited since in this case all of the electrical energy liberated on the internal resistance of the storage battery is transformed into heat. As an alternative to this measure, it is also recommended that the magnitude of the external heating resistance be selected such that the battery voltage during the flow of current drops precisely to half the value of the rest voltage. In this way the maximal power take-off of the storage battery is achieved.

In the present invention, it has been found that damage to the electrodes can be avoided when the heating resistance through which the storage battery is discharged is selected to be greater than it would be for the maximal power take-off from the storage battery. The heating current is therefore limited to a value below the maximal possible current flux, which is no higher than a highest load current specified by manufacturer. Preferably, in accordance with the present invention a lithium-ion storage battery is discharged while polarization of the negative electrode by more than 0.8 V than the potential of the metallic lithium is avoided.

The process according to the invention permits the discharge current to be limited in such a way that the storage battery voltage does not drop below half the rest voltage. This assures that no power is released on the internal components of the storage battery which could lead to local overheating.

The following examples are illustrations only and are not to be construed as limiting the invention.

EXAMPLE 1

A lithium-ion storage battery with a temperature of −20° C. is to be discharged with a current at which theoretically the storage battery will be discharged within one hour. This power can be given off by the storage battery, however, only at a temperature above 0° C. In accordance with the invention, the lithium-ion storage battery is initially, for instance, discharged, with the so called 5-hour current (C/5), i.e. with a theoretical current intensity which would lead after 5 hours to the total discharge of the storage battery. The complete transformation of this current into heat causes a temperature rise of the storage battery of about 1° C. per minute. By varying the heating resistance with increasing temperature, the current actually flowing is selected such that the storage battery voltage always remains greater than half the rest voltage. By the constant adjustment of the heating resistance to the increase in current take-off capacity parallel to the increase in temperature of the battery, the time of about 20 minutes required for heating the battery from −20° C. to 0° C. with a 5-hour current is shortened to about 4 minutes. The battery after this preheating time can supply a 1-hour current to an external user. The adjustment of the current intensity which can be taken off without damaging the battery at a selected temperature is either determined by comparison of a current value with the values stored in a memory or is determined at the time by measuring the load voltage.

The expression "structural configuration" is preferably stated as "construction arrangement."

EXAMPLE 2

A storage battery comprising several single cells wired together electrically is heated in accordance with the invention. At this time the heating current is taken off in such a way that no electrode of the cells wired in series and/or in parallel assumes unacceptable potential value. In accordance with the present invention, at least one cell feeds at least one heating element, the individual cell voltages being measured and the external heating resistance selected such that they remain below half the rest voltage in any one cell.

Although the invention has been described with reference to the above specified embodiments, this description is not meant to be construed in a limiting sense. Various modifications and changes thereto can be made by persons skilled in the art without departing from the scope and spirit of the invention as defined by the following claims.

What is claimed is:

1. A method of improving the charging and discharging capacity of a storage battery by raising the storage battery temperature using energy stored in said storage battery which comprises,
  (a) measuring a temperature and at least one state of charge value before and during heating of said storage battery,
  (b) discharging the storage battery through an electrical component introducing heating energy into it,
  (c) interrupting the discharge upon either one of two occurrences, (1) a target loadability in discharging or charging is achieved or, (2) the state of charge value decreases below a preselected threshold value.

2. The method of claim 1, wherein the discharging is not performed when either: the temperature of the storage battery is below the hardening point of its electrolyte or the state of charge value is insufficient to achieve the heating necessary to obtain the target loadability of the storage battery.

3. The method of claim 1, wherein the voltage of the storage battery is used as the state of charge value.

4. The method of claim 2, wherein the voltage of the storage battery is used as the state of charge value.

5. The method of claim 1, wherein a discharge current used for heating is increased successively with increasing storage battery temperature.

6. The method of claim 2, wherein a discharge current used for heating is increased successively with increasing storage battery temperature.

7. The method of claim 1, wherein a discharge current is used for heating and said discharge current is selected to be as high as possible but no higher than the highest load current specified by the manufacturer.

8. The method of claim 7, wherein the voltage under load is 25% to 75% of unloaded voltage.

9. The method of claim 3, wherein a discharge current is used for heating and said discharge current is selected to be as high as possible but no higher than the highest load current specified by the manufacturer.

10. The method of claim 9, wherein the voltage under load is 25% to 75% of unloaded voltage.

11. The method of claim 4, wherein a discharge current is used for heating and said discharge current is selected to be as high as possible but no higher than the highest load current specified by the manufacture.

12. The method of claim 11 wherein the voltage under load is 25% to 75% of unloaded voltage.

13. The method of claim 1, wherein the storage battery comprises a multiplicity of cells and the electrical energy stored in any one electrochemical cell is used for heating all or part of these cells when the cells are arranged in a different structural configuration.

14. The method of claim 2, wherein the storage battery comprises a multiplicity of cells and electrical energy stored in any electrochemical cells is used for heating all or only part of these cells when the cells are arranged in a different structural configuration.

15. A method of improving the charging and discharging capacity of a storage battery by raising the storage battery temperature using energy stored in said storage battery which comprises:
  (a) measuring a temperature and voltage of the storage battery before and during heating of said storage battery.
  (b) discharging the storage battery through an electrical component introducing heating energy into it,
  (c) increasing successively a discharge current used for heating with increasing storage battery temperature, said discharge current being selected to be as high as possible but no higher than a highest load current specified by the manufacturer, and wherein the voltage under load is 25% to 75% of unloaded voltage, and
  (d) discharging is not performed when:
    (1) the temperature of the storage battery is below the hardening point of its electrolyte or,
    (2) the state of charge value is insufficient to achieve the heating necessary to attain the target loadability of the storage battery,
  (e) interrupting the discharge upon one of two occurrences: a target loadability in discharging or charging is achieved or the state of charge value goes below a preselected threshold value.

16. The method of claim 15, wherein the storage battery comprises several cells and electrical energy stored in any electrochemical cells is used for heating all or part of these cells when the cells are arranged in different structural configuration.

17. The method of claim 1, wherein the storage battery is an lithium-ion battery and polarization of a negative electrode by more than 0.8 V than the potential of metallic lithium in the cell is avoided.

18. The method of claim 2, wherein the storage battery is an lithium-ion battery and polarization of a negative electrode by more than 0.8 V than the potential of metallic lithium in the cell is avoided.

19. The method of claim 3, wherein the storage battery is an lithium-ion battery and polarization of a negative electrode by more than 0.8 V than the potential of metallic lithium in the cell is avoided.

20. The method of claim 5, wherein the storage battery is an lithium-ion battery and polarization of a negative electrode by more than 0.8 V than the potential of metallic lithium in the cell is avoided.

21. The method of claim 7, wherein the storage battery is an lithium-ion battery and polarization of a negative electrode by more than 0.8 V than the potential of metallic lithium in the cell is avoided.

22. The method of improving the charging and discharging capacity of a lithium-ion storage batteries by raising a storage battery temperature using energy stored in said storage battery which comprises:
   (a) measuring a temperature and voltage of the storage battery before and during heating of said storage battery,
   (b) discharging the storage battery through an electrical component introducing heating energy into it,
   (c) increasing successively a discharge current used for heating with increasing storage battery temperature, and
   (d) discharging is not performed when:
      (1) the temperature of the storage battery is below the hardening point of its electrolyte or,
      (2) the state of charge value is insufficient to achieve the heating necessary to attain the target of the storage battery,
   (e) interrupting the discharge upon one of two occurrences: a target loadability in discharging or charging is achieved or the state of charge value goes below a preselected threshold value,
   (f) polarization of a negative electrode by more than 0.8 V than potential of metallic lithium in the cell is avoided.

23. The method of claim 22, wherein a discharge current is used for heating and said discharge current is selected to be as high as possible but no higher than the highest load current specified by the manufacturer, and the voltage under load is 25% to 75% of unloaded voltage.

24. The method of claim 23, wherein the storage battery comprises a multiplicity of cells and the electrical energy stored in any one of the electrochemical cells is used for heating all or part of these cells when the cells are arranged in a different structural configuration.

* * * * *